A. W. REDIN.
KNITTING MACHINE.
APPLICATION FILED JULY 13, 1907.

932,578.

Patented Aug. 31, 1909.
12 SHEETS—SHEET 5.

Witnesses
Milton Lenoir
George L Chindahl

Inventor
Andrew W. Redin
By Luther L. Miller
Attorney.

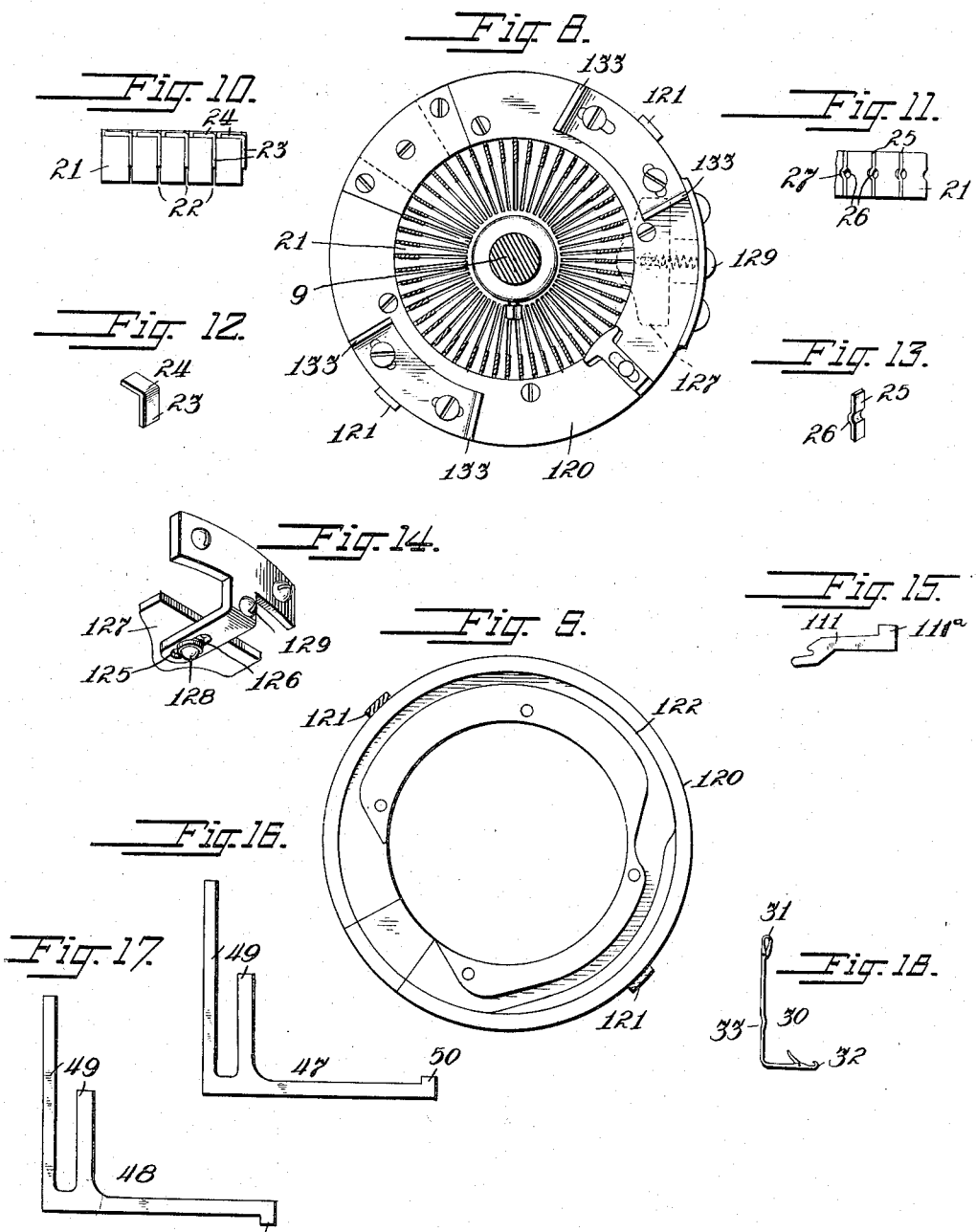

A. W. REDIN.
KNITTING MACHINE.
APPLICATION FILED JULY 13, 1907.
932,578.
Patented Aug. 31, 1909.
12 SHEETS—SHEET 7.
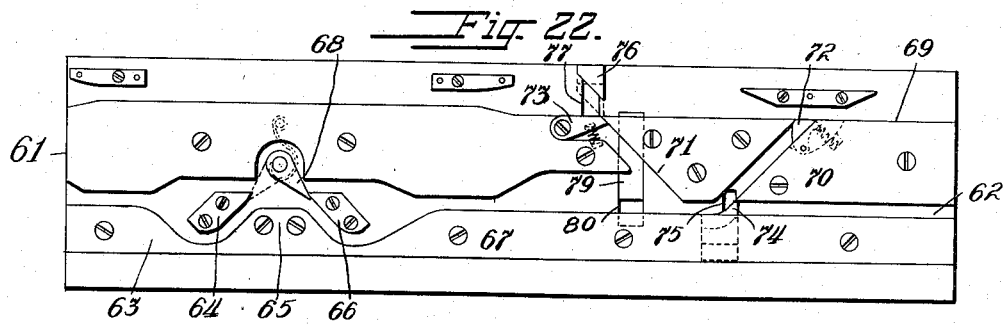
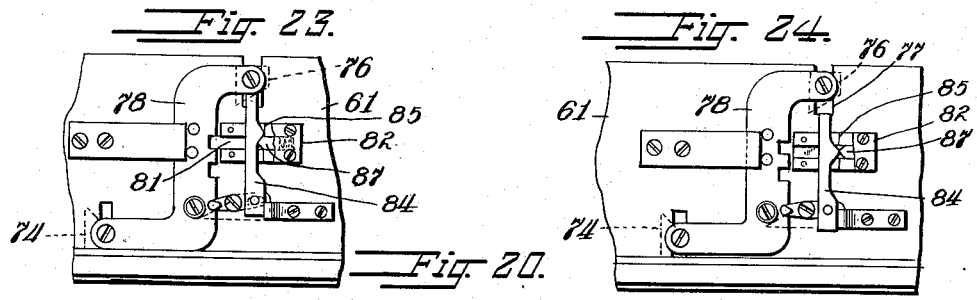
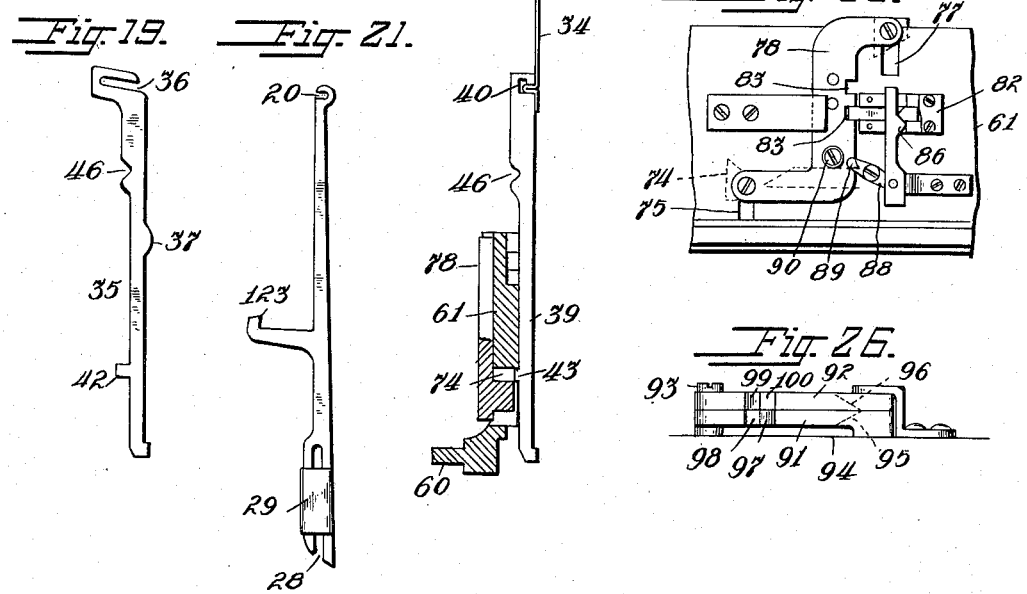
Witnesses
Milton Lenoir
George L. Chindahl
Inventor
Andrew W. Redin
By Luther L. Miller
Attorney

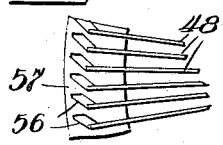
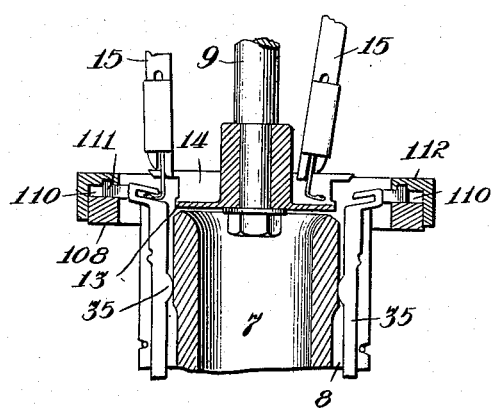
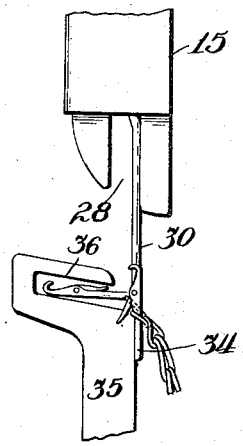
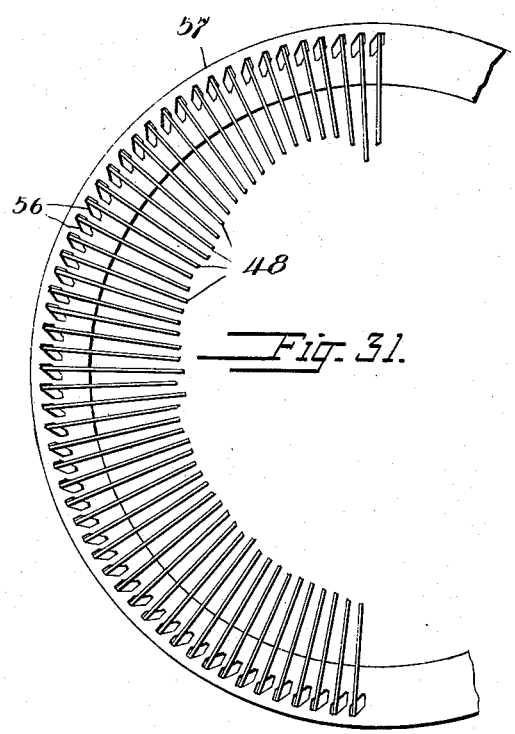
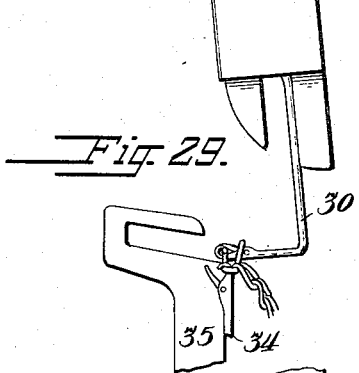
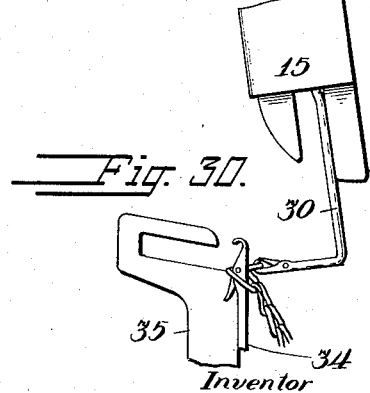

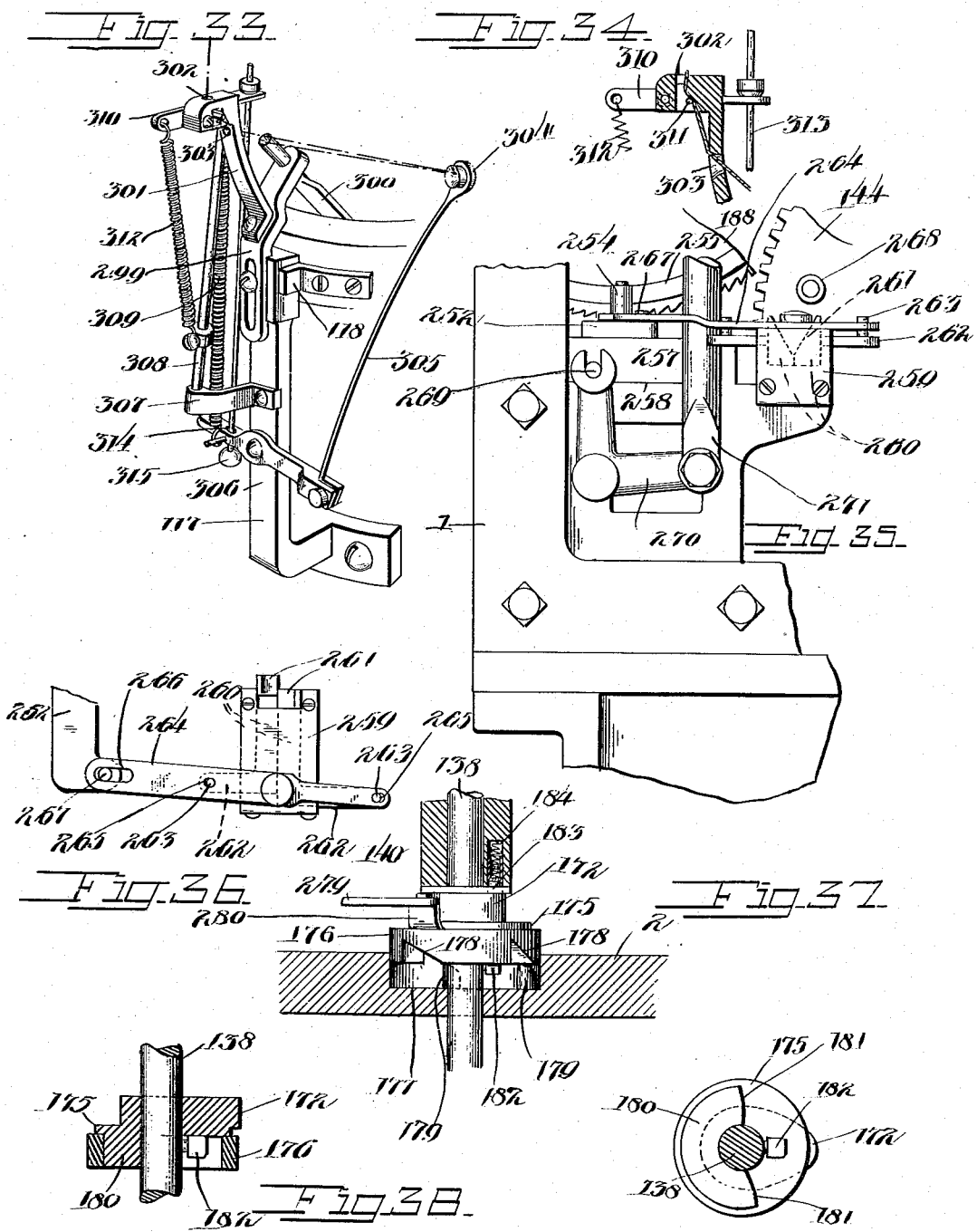

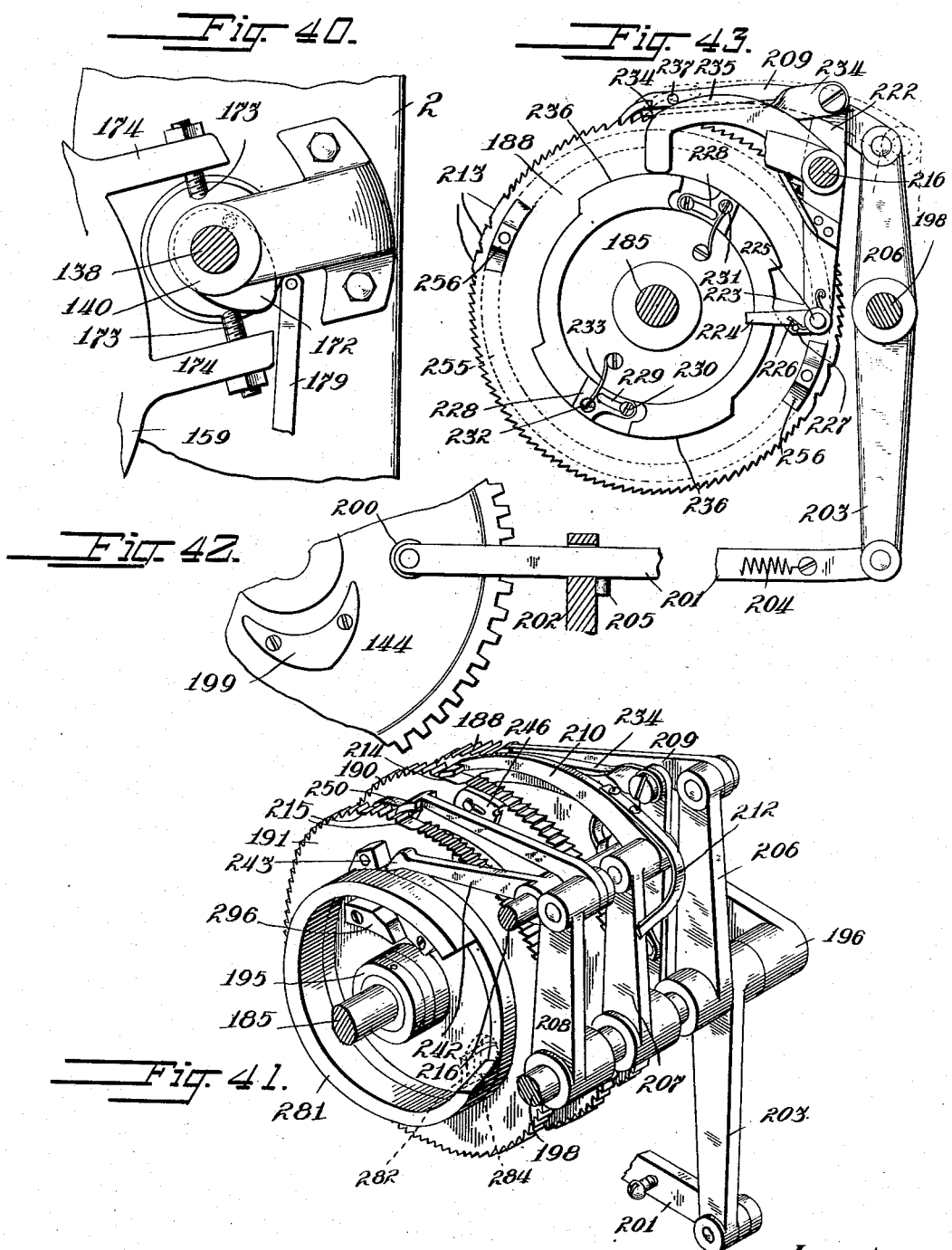

A. W. REDIN.
KNITTING MACHINE.
APPLICATION FILED JULY 13, 1907.
932,578.
Patented Aug. 31, 1909.
12 SHEETS—SHEET 11.
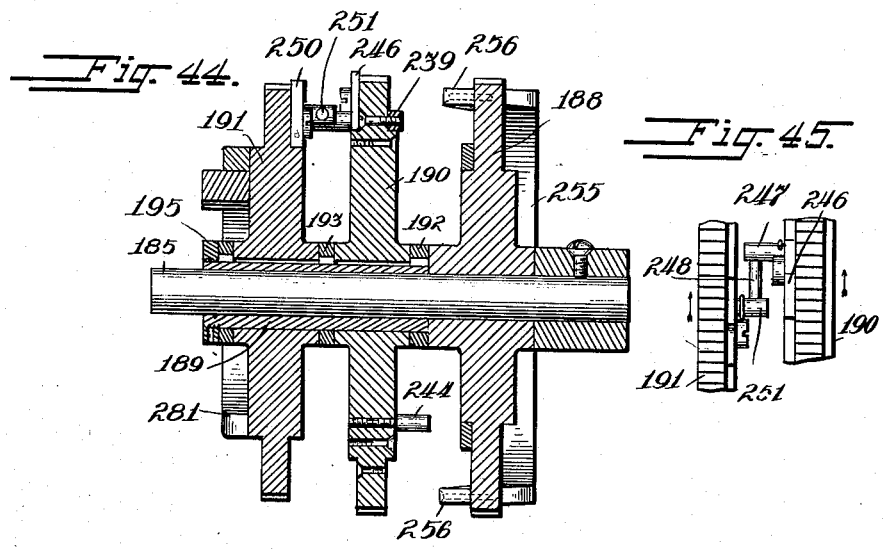
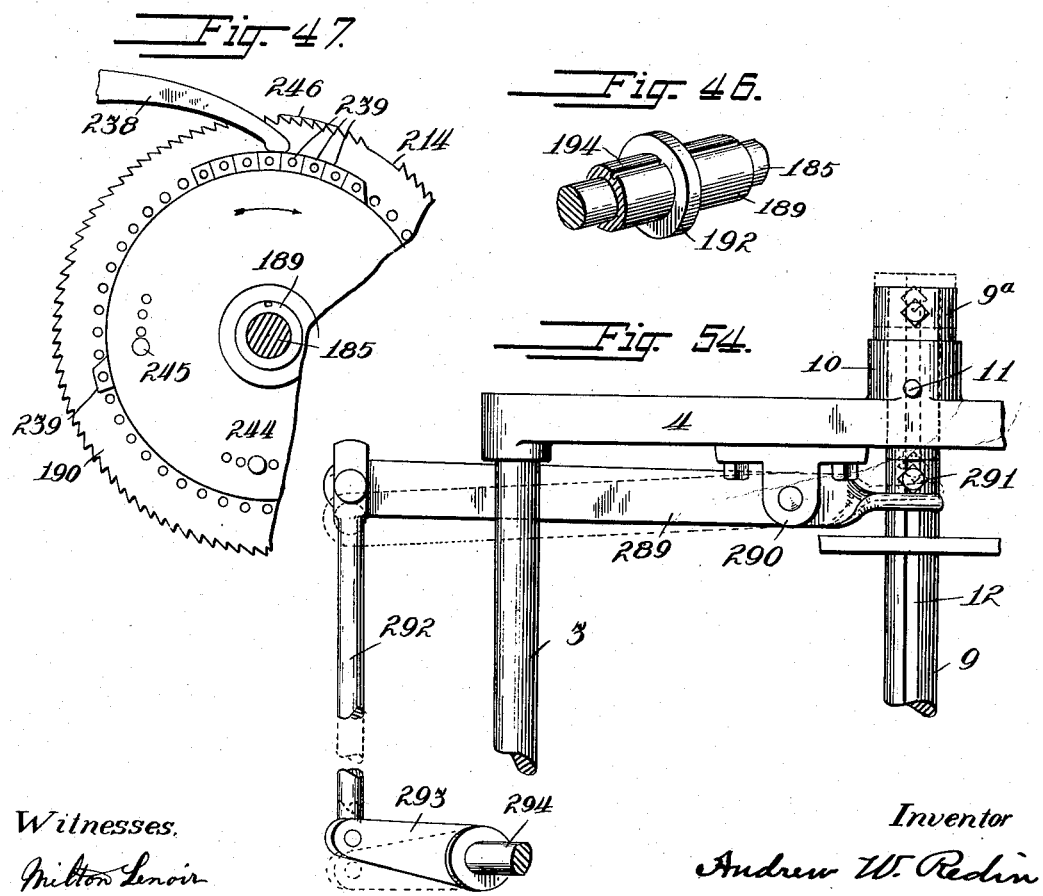
Witnesses.
Milton Lenoir
George L. Chindahl
Inventor
Andrew W. Redin
By Luther L. Miller
Attorney.

A. W. REDIN.
KNITTING MACHINE.
APPLICATION FILED JULY 13, 1907.
932,578.
Patented Aug. 31, 1909.
12 SHEETS—SHEET 12.
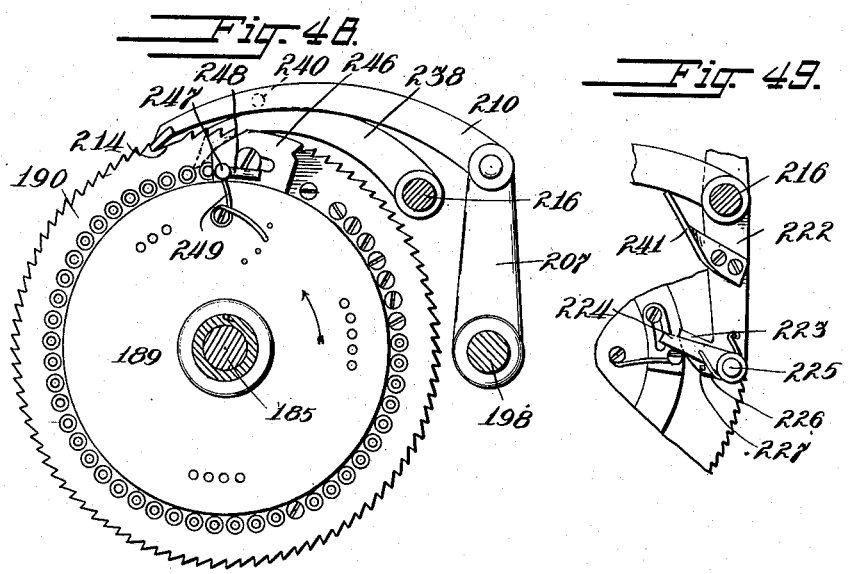
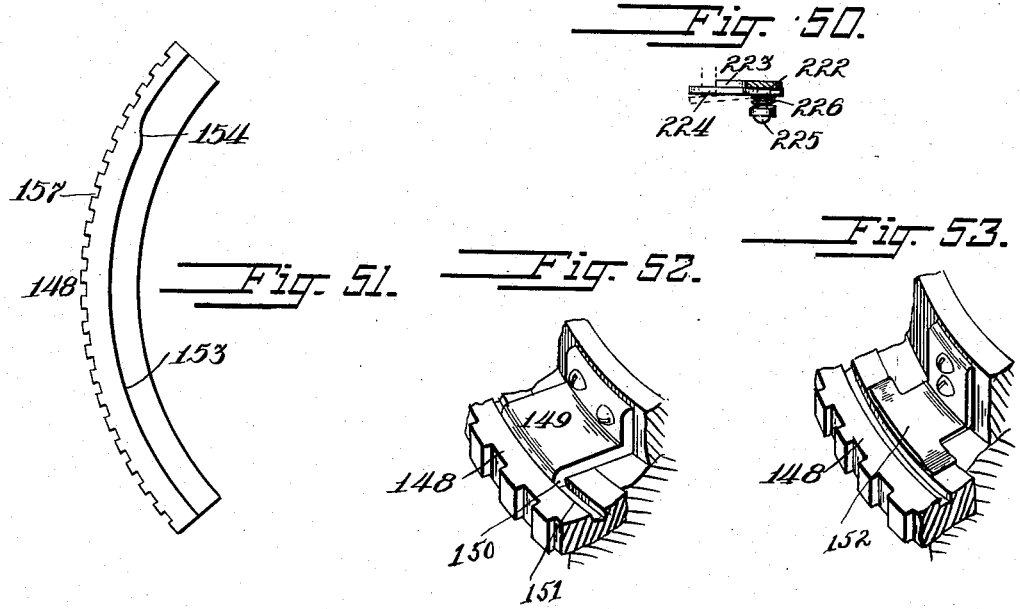
Witnesses
Milton Lenoir
George L Chindahl
Inventor
Andrew W. Redin
By Luther L. Miller
Attorney.

UNITED STATES PATENT OFFICE.

ANDREW W. REDIN, OF ROCKFORD, ILLINOIS, ASSIGNOR TO WINLUND KNITTING COMPANY, OF ROCKFORD, ILLINOIS, A CORPORATION OF ILLINOIS.

KNITTING-MACHINE.

932,578.  Specification of Letters Patent.  Patented Aug. 31, 1909.

Application filed July 13, 1907. Serial No. 383,565.

*To all whom it may concern:*

Be it known that I, ANDREW W. REDIN, a citizen of the United States, residing at Rockford, in the county of Winnebago and State of Illinois, have invented certain new and useful Improvements in Knitting-Machines, of which the following is a specification.

One of the objects of my invention is the provision, in a machine in which the knitting of different kinds of web is accomplished with one set of needles, of improved means for automatically moving certain of the needles into position to form the desired character of web.

Another object of the invention is the production of an improved means for throwing the needles into and out of action in forming the heel and the toe of a stocking.

A further object is the production of an improved pattern mechanism for knitting machines.

The invention further refers to the other improvements in knitting machines hereinafter set forth.

Figure 1:
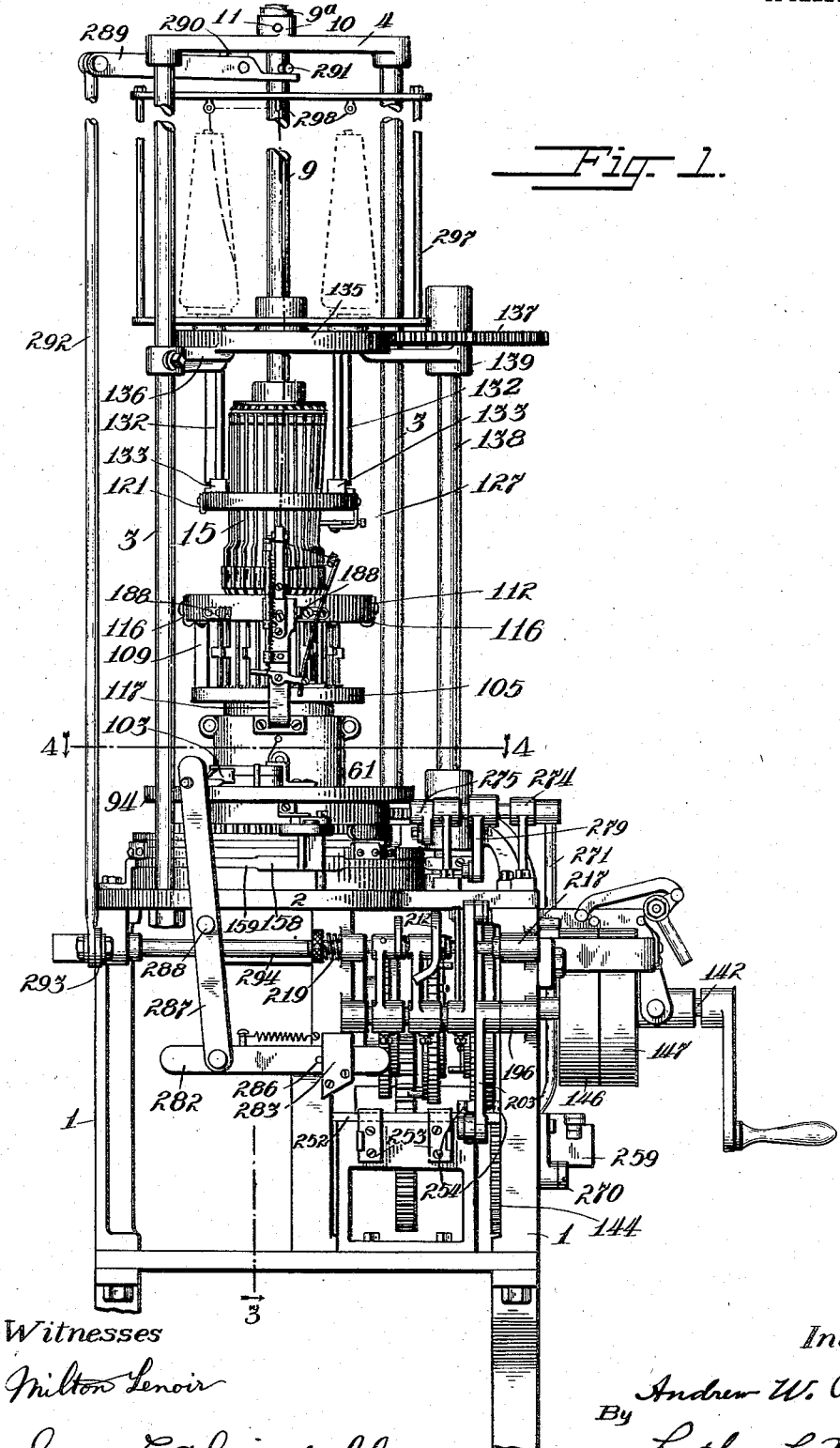
Figure 2:
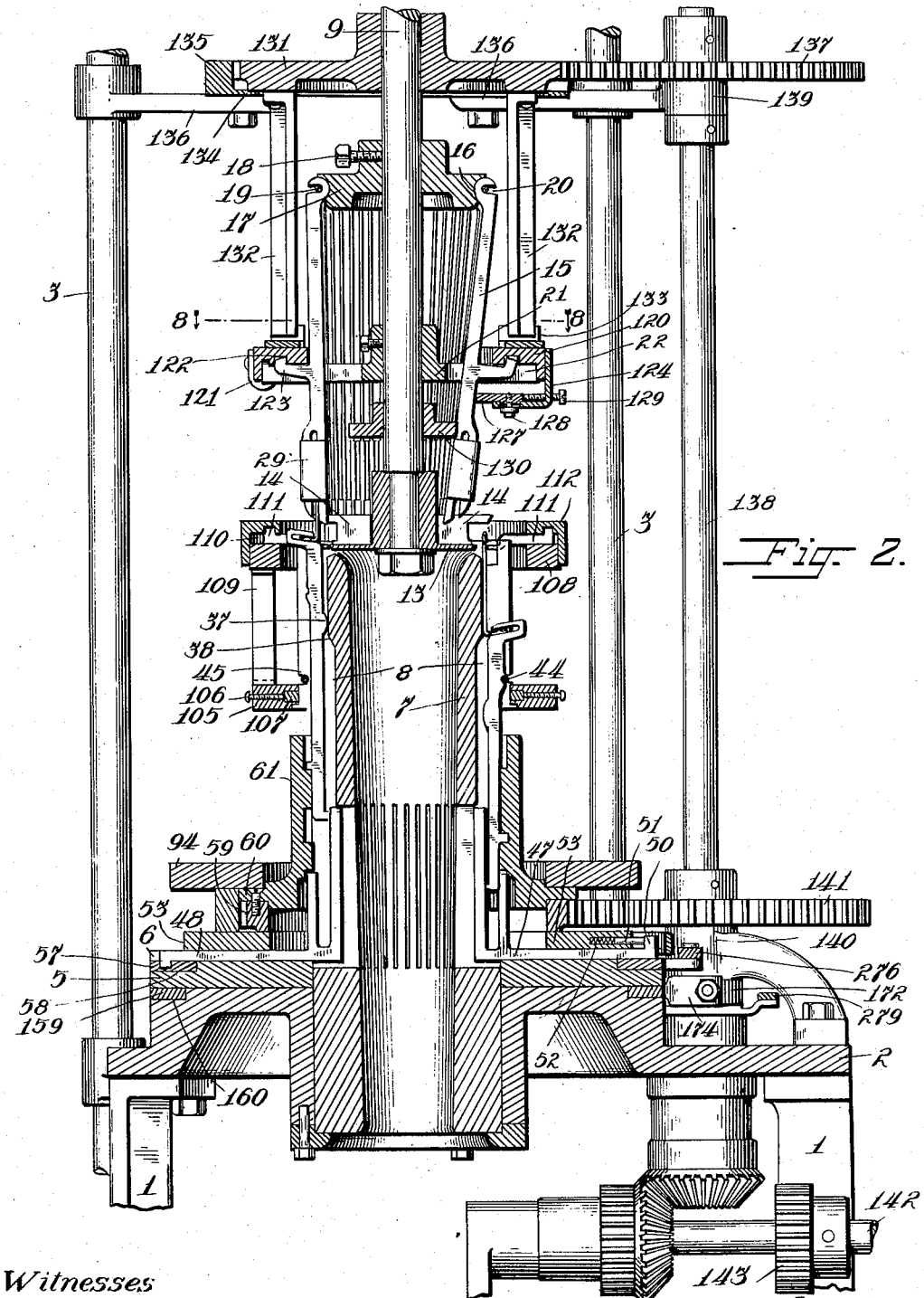
Figure 3:
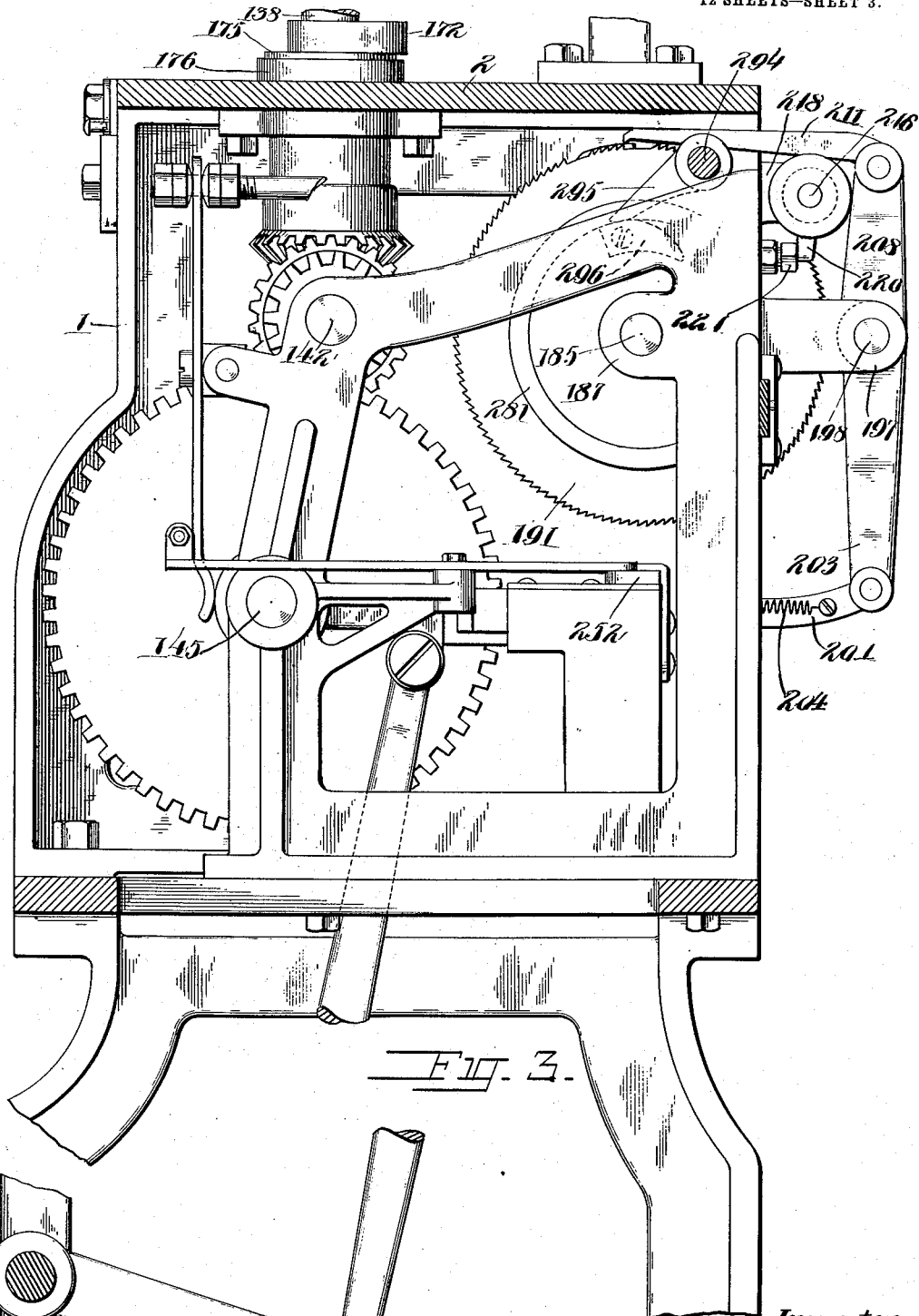
Figure 4:
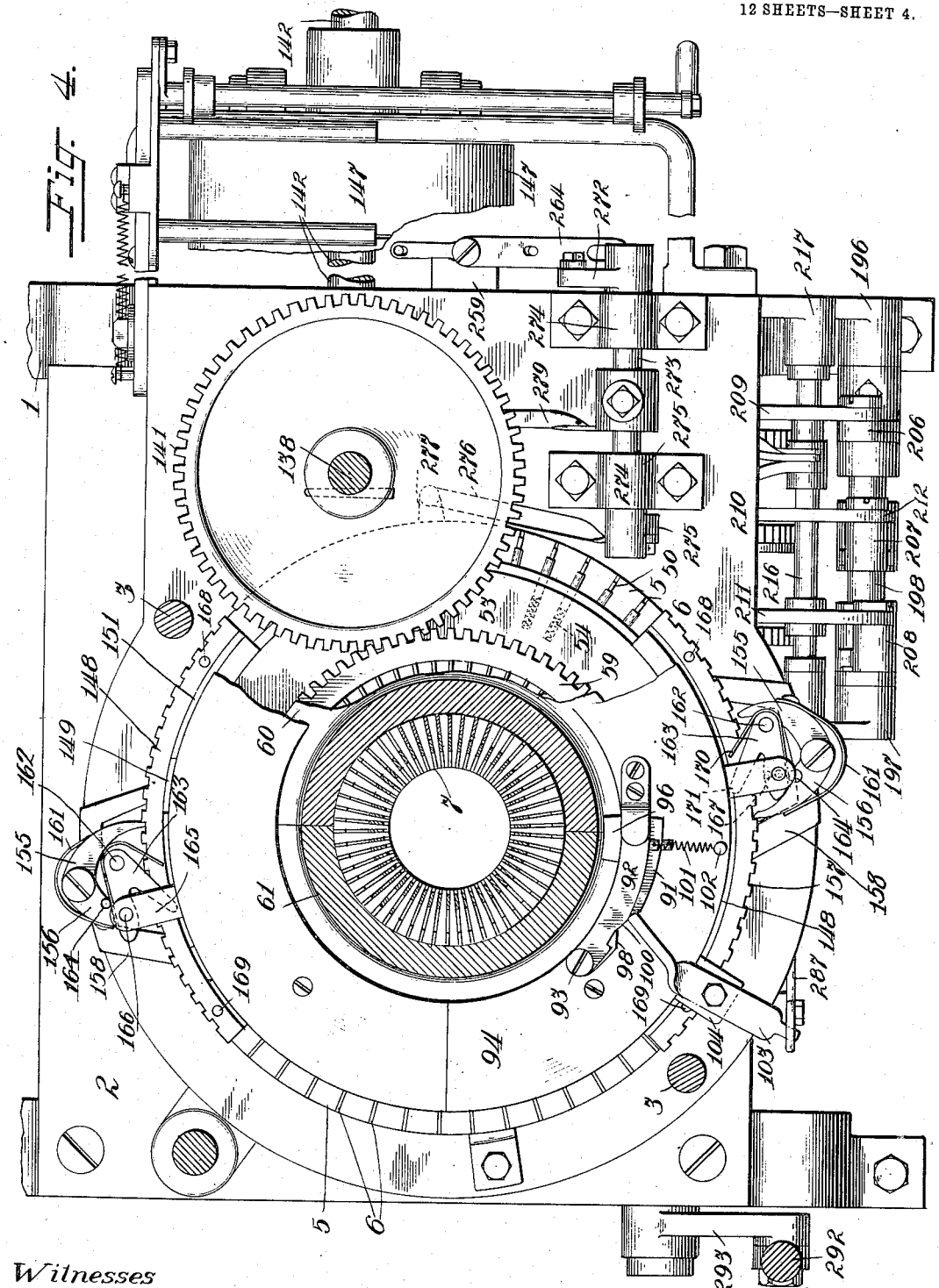
Figure 5:
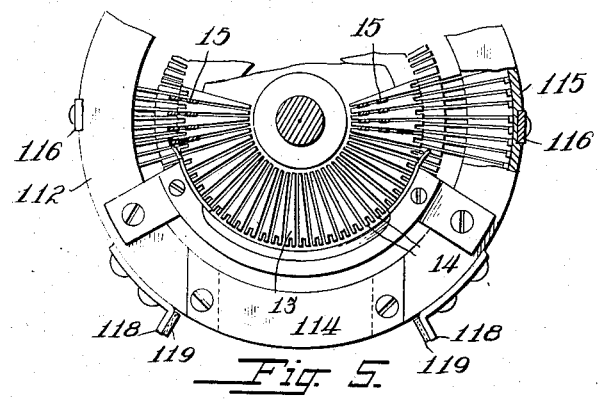
Figure 6:
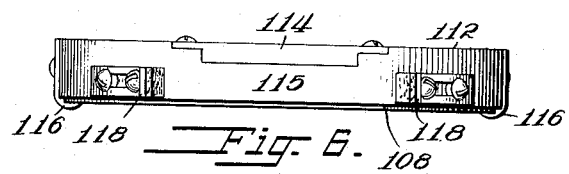
Figure 7:
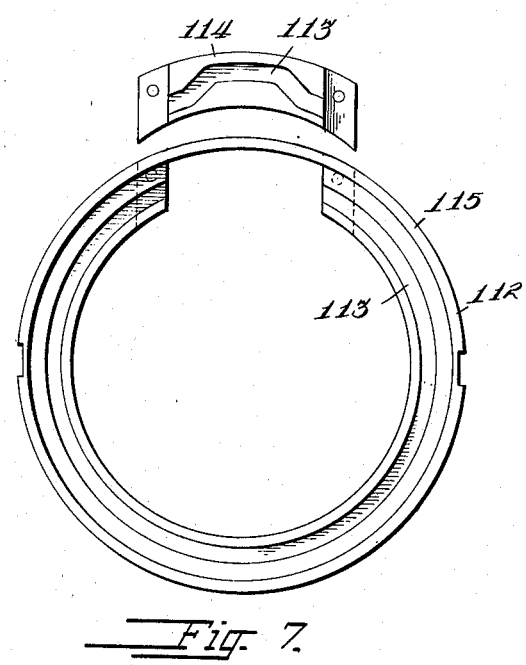

In the accompanying drawings, Figure 1 is a front elevation of a knitting machine embodying the features of my invention. Fig. 2 is a vertical central section through the knitting head. Fig. 3 is a vertical sectional view through the lower part of the machine taken substantially on the plane of dotted line 3 of Fig. 1. Fig. 4 is a horizontal sectional view on the plane of dotted line 4 of Fig. 1. Fig. 5 is a fragmental top plan view of the needle dial and web-holder cam ring. Fig. 6 is an edge view of said web-holder cam ring. Fig. 7 is an underside view of said cam ring. Fig. 8 is a horizontal section on dotted line 8 8 of Fig. 2. Fig. 9 is an underside view of the cam ring operating the dial needle jacks. Figs. 10 and 11 are fragmental edge views of the slotted disk in which the dial needle jacks operate. Figs. 12 and 13 are perspective views of devices for preventing said slotted disk from springing. Fig. 14 is a perspective view of a cam for operating the dial needle jacks. Fig. 15 is a view of one of the web-holders. Figs. 16 and 17 are views of two different forms of subjacks used in the machine. Fig. 18 shows one of the knitting needles. Fig. 19 is a detail view of the jack for operating said needle. Fig. 20 is a view of another form of needle and the jack for operating it. This view also shows the knitting cam ring in vertical section. Fig. 21 is a detail view of one of the dial needle jacks. Fig. 22 is a development of the inner surface of the knitting cam ring. Figs. 23, 24, and 25 are views, in a series, of the needle-switching devices. Fig. 26 represents two cams for operating said needle-switching devices. Fig. 27 is a vertical central section through the needle dial and the upper end of the needle cylinder showing the needles and their jacks. Figs. 28, 29, and 30 are views in a series showing the operation of the needles when forming rib-stitch fabric. Figs. 31 and 32 are fragmental views of a cam ring for operating certain of the subjacks. Fig. 33 is a perspective view of the yarn take-up. Fig. 34 is a fragmental sectional detail view of said take-up. Figs. 35, 36, 37, 38, 39, and 40 are views of the devices that throw certain of the needles into and out of action during the formation of the heel and the toe. Fig. 41 is a perspective view of the pattern mechanism. Fig. 42 is a fragmental view of the means for actuating said pattern mechanism. Fig. 43 is a sectional view showing one of the pattern wheels and associated parts. Fig. 44 is a longitudinal vertical section through the pattern mechanism. Fig. 45 is a detail view of the means carried by two of the pattern wheels for operating each other. Fig. 46 is a perspective view of a sleeve and a collar carried by the shaft that supports the pattern wheels. Fig. 47 is a fragmental side view of one of the pattern wheels. Fig. 48 is a view of the opposite side of said pattern wheel. Figs. 49 and 50 are detail views of portions of the pattern mechanism. Fig. 51 is an underside view of one of the cam bars for operating the subjacks. Fig. 52 illustrates a means for holding the cam bar in place. Fig. 53 shows a spring for preventing momentum movement of said cam bar. Fig. 54 represents a means for raising and lowering the needle dial.

The supporting framework of the machine comprises, in this instance, side frames 1, a table 2, posts 3 and a cross bar 4 joining the upper ends of said posts. Upon the table 2 is rigidly mounted a circular bed 5 provided with radial grooves 6 within which operate the subjacks to be hereinafter described. Fixed to the table 2 in a vertical position is the needle cylinder 7, said cylinder having in its periphery radial grooves 8 within which work the needles and the needle jacks.

A vertical shaft 9 is slidably mounted in a bearing 10 in the cross-bar 4, said shaft being disposed in axial alinement with the needle cylinder 7. A pin 11 (Fig. 54) fixed in the bearing 10 and projecting into a longitudinal groove 12 in the shaft 9 prevents rotation of said shaft. A stop collar 9ª fixed to the shaft 9 limits its downward movement. To the lower end of the shaft 9 is fixed a needle dial 13 (Figs. 2 and 5) having radial grooves 14 therein within which certain of the needles operate during the knitting of rib-stitch web. A circular series of jacks 15 (Figs. 2 and 21) is pivotally supported upon the shaft 9. In this instance, the jacks 15 have rounded upper ends which lie within a groove 16 formed in the periphery of a disk 17 which is secured to the shaft 9 by means of the set screw 18. In the present instance the jacks 15 are pivoted upon a ring 19 lying within notches 20 formed in the upper ends of said jacks. The jacks 15 are guided in their pivotal movements by means of a disk 21 fixed to the shaft 9, said disk having radial slots 22 therein through which said jacks extend. The slotted disk 21 may be prevented from springing in any suitable way, as by closing the outer ends of the slots 22 with filler pieces 23 (Figs. 10 and 12), each of said pieces having an angular portion 24 overlying the disk for supporting the filler pieces in position. In Figs. 11 and 13 an alternative construction is illustrated in which filler pieces 25 are employed each of said filler pieces being held from displacement by means of a bent locking portion 26 adapted to lie within an opening 27 formed in the periphery of the disk. The lower ends of the jacks 15 lie within the slots 14 of the needle dial 13. In the lower end of each of said jacks is formed a deep notch 28 (Fig. 21), the sides of which are partially closed in any suitable manner as by securing a sheet metal strap 29 around the lower end of the jack.

In the knitting of plain-stitch web all of the needles lie within the grooves 8 of the needle cylinder 7. When rib-stitch web is to be produced certain of the needles are transferred from the needle cylinder to the needle dial. In this embodiment the needles so shifted are of the double-ended form illustrated in Figs. 2 and 18. The needle 30 shown in said figures comprises what may be termed a cylinder-needle section 31 and a dial-needle section 32, the shanks of which are preferably formed integral and extend at an angle with each other. In the shank of the cylinder-needle section is formed a bend 33 for a purpose to appear hereinafter. Obviously only the needles that are transferred as above mentioned need be of the double-ended form. Those which do not leave the needle cylinder may be of any common or preferred form, as, for example, the needle 34 shown in Fig. 20. It will be understood that the relative arrangement of the needles 30 and 34 in the needle cylinder 7 depends upon the kind of rib-stitch web to be produced. For instance, in the knitting of one-and-one web every alternate needle is a plain needle 34. The jacks 35 (Fig. 19) for the needles 30 have notches 36 in their upper ends of sufficient size to receive the dial-needle sections 32. Upon each jack 35 is a rounded projection 37 adapted to ride up on a shoulder 38 in the bottom of each groove 8 in the needle cylinder, when the jack is raised, for a purpose to appear hereinafter. The jacks 39 (Fig. 20) for the needles 34 are provided with notches 40 therein to receive the butts 41 upon said needles. Upon the jacks 35 are formed butts 42 adapted for engagement by the knitting cams and the needle-switching cams, and upon the jacks 39 are butts 43 adapted to be engaged only by the knitting cams. The jacks 35 and 39 are yieldingly pivoted upon the needle cylinder 7 by means consisting, in this instance, of a coiled spring 44 lying within an annular groove 45 in the needle cylinder and engaging in notches 46 in said jacks.

In the radial grooves 6 of the bed 5 are mounted subjacks 47 48 (Figs. 2, 16 and 17). Each of said subjacks comprises two vertically-extending fingers 49 between which the lower ends of the needle jacks 35 39 are slidably mounted. The subjacks 47 are arranged about one-half of the cylinder 7 and are provided with lugs 50 against which bear pins 51, said pins being mounted in openings 52 in a ring 53 fixed to the upper side of the bed 5. Any suitable means may be provided for radially moving the subjacks 43 outward, such as, for example, a coiled spring 54 within each of said openings. The subjacks 48 are provided with lugs 55 each lying within a cam slot 56, a series of which slots are formed around one-half of a ring 57 (Figs. 2, 31 and 32) rotatably mounted in a peripheral groove 58 in the bed 5. As will be seen, a partial rotation of the ring 57 will cause a movement of the subjacks engaged by said ring either radially inward or outward, depending upon the direction of rotation. The purpose of such radial movement of the subjacks will appear hereinafter.

Rotatably mounted upon the upper side of the ring 53 is a gear ring 59 (Figs. 2 and 4) and to said gear ring is rigidly secured the flange 60 of the knitting cam ring 61. A development of the inner surface of said ring is shown in Fig. 22. A channel 62 is formed in the inner periphery of the knitting cam ring 61, the knitting cams 63, 64, 65, 66, 67, and 68 being located in said channel. These knitting cams may be of any desired construction. During the formation of plain-stitch web they act upon the butts of all of the needle jacks 35 and 39. For the purpose of elevating the jacks 35 out of the range of action of the knitting cams and for operatively associating the needles 30 carried by said jacks with the jacks 15 I provide switch cams adapted to act upon the butts 42 of the jacks 35. The butts 43 of the jacks 39 are so short as not to be engaged by said switch cams, (see Fig. 20.) Said cams will now be described.

In the upper part of the inner periphery of the knitting cam ring 61 is formed a ledge 69 connected with the channel 62 by two oppositely-inclined grooves 70 and 71. The upper end of the groove 70 is normally closed by a pivoted spring-pressed gate 72. The upper end of the groove 71 likewise is normally held closed by a pivoted, spring-actuated gate 73. A cam 74 projecting inwardly from the bottom of the channel 62 just far enough to engage the lugs 42 upon the jacks 35 is slidably mounted in a vertically extending slot 75 in the knitting cam ring 61, and is arranged to be moved vertically into position to direct the lugs 42 from the channel 62 into the groove 70, whence they are carried by the movement of the cam ring onto the ledge 69, the gate 72 yielding to allow the lugs to pass it. A cam 76 is slidably mounted in a vertical slot 77 at the upper end of the inclined groove 71, and is arranged to be lowered into position to obstruct the ledge 69 and direct the lugs 42 upon the jacks 35 downwardly into said inclined groove, the gate 73 swinging to one side to permit said lugs to pass it. The cams 74 and 76 are simultaneously operated by any suitable means. They are herein shown as fixed to a member 78 which is provided with a guide rib 79 slidably mounted within a vertically elongated opening 80 in the knitting cam ring 61. Any suitable means may be provided for locking the member 78 in its two operative positions, as, for example, a spring-pressed latch 81 slidably mounted in a housing 82 upon the outer side of the cam ring, the operating end of said latch being adapted to lie in either of two locking notches 83 in the member 78. For withdrawing the latch 81 to permit a movement of the member 78 I have provided a pin 84 slidably mounted in a guideway 85 in the housing 82, said pin carrying a projection 86 having wedging faces adapted to engage a similar projection 87 upon the latch. One end of the pin 84 is pivotally connected with one arm of a lever 88 pivoted on the cam ring. The other end of the pivoted lever 88 carries a stud 89. Upon the member 78 is pivoted a roller stud 90, said roller stud and the stud 89 forming part of a means for operating said member and its latch, which means will next be described.

Two fingers 91 and 92 are pivotally mounted one above the other at 93 upon a ring 94 fixed to the bed 5. The lower finger 91 has a wedging cam 95 adapted to be engaged by the stud 89 and roller stud 90 in the rotation of the knitting cam ring 61. When the stud 89 strikes the cam 95, said stud is moved upwardly from the position shown in Fig. 23, thereby forcing the latch 81 rearwardly in its housing 82 and out of engagement with the member 78. A moment after the stud 89 engages the cam 95 said cam is struck by the roller stud 90, and the member 78 is moved into the position shown in Fig. 25, whereupon the latch 81 is projected by its spring into the lower one of the two locking notches 83 in said member. The upper finger 92 has a cam 96 adapted to move the stud 89 and the roller stud 90 downwardly for the purpose of moving the member 78 into the position shown in Fig. 23. The finger 91 has a notch 97 therein provided with an inclined wall 98. The finger 92 has a notch 99 overlying the inclined wall 98, said last mentioned notch having an inclined wall 100 overlying the notch 97. Springs 101 attached to the fingers 91 and 92 to a stud 102 on the ring 94 tend to move the cams 95 and 96 out of the path of the studs 89 and 90. Said cams are alternately projected into the path of said studs by means of a lever 103 pivoted upon a bracket 104 fixed to the ring 94. One end of said lever is adapted to engage the inclined walls 98 and 100 of the notches 97 and 99 and swing the fingers 91 and 92 inward to project the cams 95 and 96 into the operative position. Said inclined walls being oppositely disposed, a reciprocation of the lever 103 pivotally moves the fingers 91 and 92 alternately in opposite directions. The movements of the lever 103 are given it at the proper times by a pattern mechanism to be hereinafter described.

A ring 105 (Fig. 2) is rigidly secured to the periphery of the needle cylinder 7 by means comprising, in this instance, screws 106 seated in said ring and bearing upon plugs 107 of brass or other relatively soft material, said plugs bearing upon the cylinder 7. The securing means just described does not distort the grooved peripheral portions of the needle cylinder. A web-holder bed 108 is fixedly supported about the upper end of the needle cylinder 7 by means of a plurality of posts 109 rising from the ring 105. Only one of said posts is seen in the drawings. Within radial grooves 110 in said web-holder bed are mounted the web holders 111 (Fig. 15). 112 is the web-holder cam ring. In the underside of said cam ring is formed a cam groove 113 (Fig. 7) within which the lugs 111ᵃ upon the web holders 111 are arranged to move. The part 114 of the ring 112 that contains the cam portion of the groove 113 is made removable in order to facilitate removal of the web holders 111 when desirable. The web-holder cam ring rests upon the upper side of the bed 108 and has an annular peripheral flange 115 lying about the periphery of said bed. To said annular flange are fixed lugs 116, the hooked lower ends of which underlie the web-holder bed and prevent upward displacement of the web-holder cam ring. Said cam ring, in this instance, is driven from the knitting cam ring 61 through the medium of two vertical arms 117 (Figs. 1 and 33) fixed to said knitting cam ring and adapted to engage driving lugs 118 adjustably mounted upon the flange 115 of the web-holder cam ring. The arms 117 are preferably mounted at diametrically opposite points upon the cam ring 61. Only one of said arms is shown in the drawings. Each of the driving lugs 118 is preferably faced with some yielding material 119, such as leather, to lessen the shock and noise caused by the engagement of the arms and said lugs. Two lugs 118 are provided for each of the arms 117 so that the web-holder cam ring may be driven in either direction during reciprocatory knitting.

The jacks 15 are pivotally moved by means comprising, in this instance, a cam ring 120 rotatably mounted upon the disk 21 and held from upward displacement by hooked lugs 121 similar to the lugs 116. In the under side of the cam ring 120 is a groove 122 with which are engaged lugs 123 formed upon said jacks. To the cam ring 120 is fixed a bracket 124 having an elongated opening 125 therein through which a rib 126 on the under side of a cam 127 extends. A clamping screw 128 having a washer thereon extends into said rib, said washer bearing upon the bracket 124, whereby the cam 127 is secured in adjusted position. 129 is a set screw assisting to hold the cam 127 in position. The cam 127 moves the lower ends of the jacks inwardly, their inward movement being limited by a collar 130 fixed to the shaft 9. In the present embodiment the cam ring 120 and the cam 127 are driven from a gear wheel 131 loosely mounted upon the shaft 9, by means of two posts 132 fixed to the under side of said gear wheel, the lower ends of said posts lying between adjustable driving lugs 133 upon the upper side of said cam ring. The gear wheel 131 rests upon the annular flange 134 of a ring 135, said ring having arms 136 by means of which it is secured to the posts 3. Said gear wheel 131 meshes with a gear 137 fixed to the upper end of a vertical shaft 138 rotatably mounted in bearings 139 and 140. Upon said shaft is fixed a gear wheel 141 meshing with the gear ring 59.

The vertical shaft 138 is driven from the drive shaft 142 through connections adapted to impart oscillatory and continuous rotary movements to said vertical shaft. Any suitable means may be provided for alternately placing these connecting means in action. I have herein shown portions of a motion-changing mechanism which is fully disclosed in my co-pending application for United States Letters Patent Serial No. 376,602. The driving connections alluded to comprise a pinion 143 (Fig. 2) fixed to the drive shaft 142 and meshing with a gear wheel 144 (Figs. 1 and 42) fixed to a shaft 145. (Fig. 3.) Upon the outer end of the drive shaft are mounted a tight and a loose pulley 146 and 147, respectively.

When the heel and the toe are to be formed half of the needles are simultaneously thrown out of action by a partial rotation of the ring 57, said ring moving the subjacks 48 inwardly far enough to carry the butts 42 and 43 upon the needle jacks 35 and 39 engaged by said subjacks out of the path of the knitting cams. Certain of the remaining needles are progressively thrown out of action and again placed in action by means to be now described.

Two cam bars 148 (Figs. 4 and 51) slidably mounted upon the bed 5 are arranged to be moved over the lugs 50 upon certain of the jacks 47, for moving said jacks radially inward to throw the needles carried thereby out of operation. Each of the cam bars 148 is held in proper relation to the bed 5 by means of a lug 149 (Figs. 4 and 52) fixed with relation to said bed and having a downturned end 150 lying in a groove 151 formed in said bar. The cam bar 148 is frictionally held from momentum movement by a spring 152 (Fig. 53) fixed to the bed 5 and bearing upon the cam bar. In the lower side of each cam bar is formed a rabbet 153 to receive the lugs 50 upon the subjacks 47. The rabbet 153 is wider at the forward end of the cam bar, the wider and narrower portions of the rabbet being joined by a curved wall 154. Normally the lugs 50 lie in the position indicated in Fig. 2. When the cam bar is moved onto the lugs 50 said lugs are forced by the cam action of the curved wall 154 radially inward to lie within the narrower portion of the rabbet 153, the radial movement of said jacks being sufficient to clear the butts of the needles carried thereby from the knitting cams. Each of the cam bars 148 is moved by means comprising, in this embodiment, two pawls 155 and 156 adapted to engage square teeth 157 formed upon the outer side of said bar. The pawls are pivotally mounted upon a bracket 158 fixed to an oscillatory ring 159 rotatably mounted in an annular groove 160 in the table 2. (Fig. 2.) A curved leaf spring 161 bearing at its opposite ends upon the pawls 155 and 156 tends to move them into engagement with the teeth 157. The pawl 155 is moved out of engagement with the teeth 157 upon a movement of the oscillatory ring 159 in one direction by a stud 162 rising from the table 2. The pawl 156 is held out of engagement with the teeth 157 at certain times by a detent 163 pivotally supported, in this instance, upon the stud 162, said detent engaging a pin 164 fixed to the pawl 156. A leaf spring 165 fixed to the bed 5 carries a locking projection 166 adapted to lie in either of two openings 167 in the detent 163 for releasably locking said detent against movement. The detent is pivotally moved by means of two pins 168 and 169, one at each end of the bar 148, said pins being adapted to engage fingers 170 and 171, respectively, on said detent.

When throwing needles out of action the operation of each of the cam bars 148 is as follows: A partial counter-clockwise (Fig. 4) rotation of the oscillatory ring 159 advances the cam bar in the same direction through the distance of one tooth (which is sufficient to move one subjack 47 inwardly) through the engagement of the pawl 155 with a tooth of said bar, the pawl 156 meanwhile being held out of engagement with said bar by the detent 163. Upon a partial rotation of the ring 159 in the opposite direction the pawl 155 is withdrawn from the cam bar by the stud 162. A partial rotation of the ring 159 in the first mentioned direction again moves the cam bar through the distance of one tooth. The cam bar is thus moved step by step until the pin 169 engages the finger 171 upon the detent 163, when said detent is pivotally moved out of engagement with the pin 164 upon the pawl 156. Said pawl 156 is now moved by the spring 161 into engagement with the teeth of the cam bar, said pawl sliding over said teeth upon its return movement. The needle-restoring or return movement of the cam bar is now begun. The continuing oscillations of the ring 159 result in feed movements by both of the pawls 155 and 156. The pawl 156, however, is in engagement with a tooth of the cam bar throughout its entire feed movement, whereas the pawl 155 is withdrawn from its tooth toward the end of its return movement by the stud 162 and held by said stud out of engagement with the cam bar during the first part of its feed movement. The feed movement of the pawl 155 is therefore shorter than that of the pawl 156. Each partial rotation of the ring 159 is sufficient to cause a movement of the cam bar through the distance of two teeth, which distance is sufficient to throw two needles into or out of action. It will thus be seen that during the needle-restoring movement of the cam bar, said cam bar is advanced through the distance of two teeth by the pawl 156, and returned through the distance of one tooth by the pawl 155.

The ring 159 is oscillated by means of a cam 172 (Fig. 40) driven by the vertical shaft 138 and adapted to engage alternately with two adjustable stops 173 carried upon arms 174 fixed to said ring. In this instance the cam 172 is arranged to be vertically moved into and out of the plane of the stops 173. For this purpose I mount said cam upon a disk 175 (Figs. 37, 38 and 39) which overlies a ring 176 rotatably mounted in a recess 177 in the table 2. Said ring has a plurality of cam surfaces 178 thereon adapted to coact with a corresponding number of pins 179 fixed in the recess 177, said pins having beveled upper ends. The means for rotating the ring 176 to cause it to ride up on the beveled pins 179 will be described hereinafter. Upon the lower side of the disk 175 is a portion 180 having end walls 181 adapted to be engaged by a stud 182 fixed upon the vertical shaft 138. When said shaft is rotated or oscillated the stud 182 strikes against the end walls 181 and rotates or oscillates the cam 172. Preferably means, such as a spring plunger 183 seated in an opening 184 in the bearing 140, is provided for returning the ring 176 and the cam 172 to their normal, lower position.

The pattern mechanism will next be described. See Figs. 3 and 41 to 50. A shaft 185 is fixed in bearings 186 and 187 in the machine frame. Upon said shaft is loosely mounted a pattern wheel 188. Upon a sleeve 189 fixed on the shaft 185 are loosely mounted two pattern wheels 190 and 191, said wheels being spaced from each other and from the wheel 188 by means of washers 192, each of said washers having a lug 193 thereon which projects into a longitudinal groove 194 formed in the sleeve 189. The purpose of the washers 192 is to prevent the rotation of one of the pattern wheels from frictionally moving another of said wheels. Threaded upon one end of the sleeve 189 is a nut 195 by means of which sufficient tion of said pattern wheels. The pattern wheels and washers to prevent too free rotation of said pattern wheels. The pattern wheel 188 actuates the motion-changing mechanism and the throwing of the needles into and out of action during the formation of the heel and the toe. The pattern wheel 190 determines the length of the foot and the plain-stitch portion of the leg. The pattern wheel 191 operates the needle-switching cams and the means for raising and lowering the needle dial. In bearings 196 and 197 in the machine frame is mounted a rock shaft 198. Said shaft is rocked in one direction by means of a cam 199 (Fig. 42) fixed to one side of the gear wheel 144, said cam engaging a roller stud 200 carried upon one end of a rod 201 slidably mounted in a bearing 202. The other end of said rod is pivotally connected with an arm 203 fixed to the rock shaft 198. A coiled spring 204 fixed to said rod and to a stationary part of the framework rocks the shaft 198 in the opposite direction. A stop pin 205 fixed in the rod 201 limits the movement of said rod in one direction by impinging upon the bearing 202. Three arms 206, 207, and 208 are fixed to the rock shaft 198 and carry pawls 209, 210 and 211 adapted to engage ratchet teeth formed upon the peripheries of the pattern wheels 188, 190 and 191, respectively. A spring 212 tends to hold the pawl 210 in engagement with the ratchet teeth of the pattern wheel 190.

At diametrically opposite points upon the periphery of the pattern wheel 188 three blank spaces 213 are provided. A blank space 214 is formed upon the periphery of the pattern wheel 190. The pattern wheel 191 has two blank spaces 215 upon its periphery. The pawl 209 is moved into and out of operative engagement with the pattern wheel 188 and the extent of its operative engagement with said pattern wheel determined by means to be next described. A rock shaft 216 is mounted in bearings 217 and 218 in the machine frame. A torsion spring 219 fixed at one end to the shaft 216 and at its other end to the bearing 218 tends to rock the shaft in one direction, said movement of said shaft being limited by the impingement of the stud 220 carried by said shaft upon an adjustable stop 221 upon the machine frame. Upon said shaft is fixed a lever 222 having a cam projection 223 at its lower end. A finger 224 is pivotally mounted upon a pin 225 fixed in the lever 222, said finger being adapted for a slight amount of sidewise movement. A spring 226 tends to hold the finger 224 against the stop pin 227 on said lever. At diametrically opposite points upon one face of the pattern wheel 188 are slidably mounted two blocks 228. Each of said blocks has an elongated opening 229 therein through which the screw 230 extends for slidably mounting said block upon a pattern wheel. Each of said blocks carries a pin 231 232 having a beveled outer end. A spring 233 tends to hold each of said blocks in the position shown in Fig. 43. In the rotation of the pattern wheel 188 the pins 231 and 232 are carried into engagement with the cam face of the projection 223 upon the lever 222, forcing said projection outwardly and thereby rocking said lever. At the same time the finger 224 yields laterally, being returned by the spring 226 to its normal position as soon as the pin has passed said finger.

To the upper end of the lever 222 is pivoted a detent 234 which, when said lever is tilted by one of the pins 231, 232, is projected beneath the point of the pawl 209 and holds the latter out of engagement with the ratchet teeth of the pattern wheel 188, thus stopping the rotation of said pattern wheel. A cam finger 235 is loosely mounted upon the shaft 216 and is adapted to bear upon two cam surfaces 236 upon one side of the pattern wheel 188. Fixed to the pawl 209 is a pin 237 arranged to ride up on the cam finger 235 when said finger is on the cam surface 236, for raising the pawl 209 out of the ratchet teeth of the pattern wheel 188, and thus reducing the effective extent of the feed movement of said pawl.

A finger 238 is loosely mounted upon the shaft 216 and is adapted to bear upon cam blocks 239 adjustably mounted upon one side of the pattern wheel 190. The finger 238 underlies a projection 240 upon the pawl 210, and when said finger bears upon the cam blocks 239 the projection 240 rides up on the finger 238 during the return or backward movement of the pawl 210 and thus reduces the effective extent of the feed movement of said pawl. The pawl 210 also is operated by the lever 222, said lever carrying a fixed projection 241 adapted to engage and raise the finger 238 which in turn raises said pawl out of engagement with the pattern wheel 190. A finger 242 loosely mounted upon the shaft 216 is arranged to be engaged by a cam 243 adjustably mounted upon the pattern wheel 191 and is adapted to lift the pawl 211 out of engagement with said pattern wheel.

244 and 245 are two pins adjustably fixed to one side of the pattern wheel 190 in position to engage the finger 224.

Upon the side of the pattern wheel 190 which faces the pattern wheel 191 is slidably mounted a rest 246 adapted to support the pawl 210 above its ratchet teeth. 247 is a pin fixed to said rest, and 248 is a pin fixed in the first mentioned pin and extending at a right angle thereto. A spring 249 tends to hold the rest in position shown in Fig. 48. 250 is a similar rest slidably mounted upon the adjacent side of the pattern wheel 191. Said rest carries a pin 251 adapted to engage the pin 248 or to be engaged by the pin 247.

The motion-changing mechanism comprises a bar 252 slidable in bearings 253 in the machine frame. Upon said bar are mounted two roller studs 254 which lie at opposite sides of a cam flange 255 upon the pattern wheel 188. At diametrically opposite points cam portions 256 are formed in said flange adapted to impart a reciprocatory movement to the bar 252. The motion-changing mechanism changes the movements of the knitting cams from round and round to oscillatory and vice versa, the toe and heel being formed by oscillatory knitting.

To provide for the throwing in and out of the knitting needles during the formation of the toe and the heel the following described mechanism is employed, said mechanism operating simultaneously with the motion-changing mechanism. A plunger 257 (shown in Fig. 35) is slidably mounted in a guide-way 258 in the frame. Upon the forward end of said plunger is mounted a housing 259 in which are slidably mounted two pins 260 having inclined cam faces 261. Each of the pins 260 has an arm 262 fixed thereto, and each of said arms carries at its outer end a stud 263. A lever 264 is pivotally mounted at a point between its ends upon the housing 259, and has two elongated openings 265 therein into which the studs 263 extend. In one end of the lever 264 is an elongated opening 266 in which lies a stud 267 fixed to the slidable bar 252 of the motion-changing mechanism. Upon one side of the gear wheel 144 is a roller stud 268 adapted to engage the cam faces 261 of the pins 260. The plunger 257 has a stud 269 fixed thereto which lies in the forked upper end of one arm of a bell-crank lever 270 pivoted on the machine frame. The other end of said bell-crank lever is connected by means of a link 271 with a crank 272 fixed to a shaft 273 which is mounted in bearings 274 upon the table 2. An arm 275 fixed to the shaft 273 is connected by means of a link 276 with an arm 277 fixed to the cam ring 57. Another arm 278 fixed to the shaft 273 is connected through the medium of a link 279 with an arm 280 fixed to the ring 176. In the rotation of the pattern wheel 188 the cams 256 acting upon the roller studs 254 longitudinally move the bar 252 and actuate the motion-changing mechanism. The lever 264 being connected with the bar 252, said lever is rocked, projecting one or the other of the pins 260 into the path of the roller stud 268 upon the gear wheel 144. When said roller stud engages the pin thus projected it forces the plunger 257 in one direction or the other in its guide-way 258, depending upon which pin was projected, and the movement of the plunger is transmitted through the bell-crank lever 270 and the link 271 to the shaft 273, actuating the cam ring 57 and the ring 176.

The needle-switching devices are operated by a cam 281 upon the side of the pattern wheel 191. A rod 282 is slidably mounted in a guide 283 upon the machine frame. Upon one end of said rod is a roller stud 284 arranged to be engaged by the cam 281. A spring 285 fixed to said rod and to a stationary part of the machine frame holds said roller stud in position to be engaged by the cam. A stop pin 286 fixed in said rod limits the movement of said rod in one direction. The rod 282 is pivotally connected with one end of a lever 287 pivoted between its ends at 288. The upper end of the lever 287 is connected with one end of the lever 103. When the pattern wheel 191 is rotated and the roller stud 284 rides up on the cam 281 the lever 103 is pivotally moved to project the cam 95 into the path of the studs 89 and 90 of the needle-switching devices, whereby the needles 30 are transferred from the needle cylinder to the needle dial. When the roller stud 284 rolls off the cam 281 the spring 285 causes a pivotal movement of the lever 103 in the opposite direction, and projects the cam 96 into the path of the studs 89 and 90, for returning the needles 30 to the needle cylinder.

While the heel and the toe are being knitted sufficient space must be provided between the lower side of the dial 13 and the adjacent part of the needle cylinder 7 for the bag formed by the heel and the toe to pass downward. During the knitting of the rib top, however, the grooves 14 of the dial 13 and the notches 36 of the jacks 35 must be in the same horizontal plane, in order that the dial needle sections of the needles 30 may reciprocate from one to the other. In the present embodiment I provide means for holding the dial 13 slightly elevated at all times except when the rib top is being knitted, said means comprising a lever 289 (Figs. 1 and 54) pivoted at a point between its ends in a bearing 290 carried by the cross-bar 4. One end of said lever is forked to lie at opposite sides of the vertically slidable shaft 9, said forked end underlying two pins 291 fixed in opposite sides of said shaft. The other end of the lever 289 is connected by means of the link 292 with an arm 293 fixed to a rock shaft 294. Upon one end of the rock shaft 294 is an arm 295 adapted to be engaged by a cam 296 fixed to the pattern wheel 191. When said cam moves from under the arm 295 the weight of the parts fixed to the shaft 9 lowers said parts into the rib-stitch knitting position. The stop collar 9ª fixed on the upper end of the shaft 9 limits its downward movement.

The spool or spools of yarn may be supported in any suitable way, as, for example, in a frame 297 fixed to the gear wheel 131. On the upper member of said frame are eyelets 298 through which the yarn extends to and through an opening (not shown) in the gear wheel 131, and thence to a take-up device traveling with the yarn-feeding member. Said yarn feeding member and take-up are fixed to one of the arms 117. (Fig. 33.)

299 is a bracket adjustably fixed to the arm 117. To said bracket is adjustably secured the yarn-feeding tube 300. An arm 301 is fixed to the bracket 299 and has two openings 302 and 303 therein through which the yarn passes. In passing from the opening 303 to the yarn-feeding tube 300 the yarn extends through the eye 304 of the take-up arm 305, said arm being pivoted to the arm 117 at 306.

307 is an arm fixed to the arm 117 and carrying a vertically extending rod 308 to which is secured one end of a coiled spring 309 which is attached at its other end to the take-up arm 305. During oscillatory knitting the arm 305 takes up the yarn not engaged by the needles. When said arm holds a supply of yarn it is desirable that the needles shall draw from the take-up arm rather than from the bobbins. I therefore provide a lever 310 pivotally mounted upon the arm 301, said lever carrying a pin 311 between which and an adjacent part of said arm the yarn runs in passing from the opening 302 to the opening 303. A spring 312 fixed to one end of the lever 310 and to the rod 308 tends to move the pin 311 into position to clamp the yarn between it and the arm 301. A link 313 connects the levers 310 and the take-up arm 305, lost motion being provided between said arm and said link. The latter passes freely through an opening 314 in the arm 305, and has fixed to its lower end a stop member 315 adapted to be engaged by said arm for operating the lever 310 to release the yarn.

Assuming the machine to be knitting the "ravel" at the end of the toe, the operation is as follows: The rotation of the pattern wheel 188 brings the cams 256 into engagement with the roller studs 254 upon the slidable bar 252. Said bar is thereby moved longitudinally, actuating the motion-changing mechanism to change the movements of the knitting devices from round-and-round to oscillatory, and actuating the devices for raising the cam 172 into the plane of the studs 173, and also oscillating the ring 57 to throw one-half of the needles simultaneously out of action. The pattern wheel 190 stands at rest, its pawl 210 being held out of the ratchet teeth of said pattern wheel by the projection 241 and the arm 238. The cam wheel 191 also stands at rest, its pawl 211 sliding idly on the rest 250. The cam wheel 188 is rotated by its pawl 209 until the cams 256 engage the roller studs 254 upon the bar 252. The motion-changing mechanism is now actuated to change the motion of the knitting mechanism from oscillatory to round-and-round. The cam 172 is lowered, and the ring 57 rotated to throw the needles under its control into operation. The pin 232 carried by the pattern wheel 188 striking against the cam projection 223 upon the lever 222 rocks said lever, which causes the detent 234 to be inserted between the pawl 209 and the ratchet teeth of said pattern wheel, the rotation of said wheel being thereby suspended, and the pin 230 consequently stopping while upon said cam projection 223. The finger 224 slips off the beveled end of said pin and drops beneath it. The tilting of the lever 222 also permitted the pawl 210 to engage the ratchet teeth of the pattern wheel 190 which is now rotated during the knitting of the foot. The rotation of the pattern wheel 190 carries the pin 244 into engagement with the finger 224 and swings said finger upward, the latter carrying before it the pin 230 upon the pattern wheel 188 until said pin is raised above the point of the cam projection 223, whereupon the torsion spring 219 rocks the lever 222, withdrawing the detent 234 from beneath the pawl 209, starting the pattern wheel 188 into operation, and raising the pawl 210 out of engagement with the pattern wheel 190. The rotation of the pattern wheel 188 operates the motion-changing mechanism, and causes the formation of the heel. When the knitting of the heel is completed the rotation of the pattern wheel 188 brings the cams 256 into operation, actuating the motion-changing mechanism, and the pin 231 upon the pattern wheel 188 tilts the lever 222, as before described, said pattern wheel thereby being stopped and the pattern wheel 190 again placed in operation. The knitting of the leg is now begun.

The rotation of the pattern wheel 190 brings the pin 247 thereon into engagement with the pin 251, moving the rest 250 to which said pin 251 is attached out from under the pawl 211. At the same time the rotation of the pattern wheel 190 carries the rest 246 beneath the pawl 210, stopping the rotation of the pattern wheel 190. The pattern wheel 191 now is rotated, carrying the cam 281 into engagement with the roller stud 284, and operating the needle-switching devices. The cam 296 also is rotated out from beneath the arm 295, rocking the shaft 294, and lowering the needle dial 13. The formation of the ribbed top now begins. When the roller 284 runs off the cam 281 the needle-switching devices are operated to return the needles 30 to the needle cylinder, and the needle dial is elevated by the engagement of the cam 296 with the crank arm 295. The knitting of the "ravel" then takes place. The continued rotation of the pattern wheel 191 carries the pin 248 into engagement with the pin 247 carried by the pattern wheel 190, withdrawing the rest 246 from beneath the pawl 210. The pattern wheel 190 now is rotated. The pattern wheel 191 continues to rotate until the rest 250 comes beneath the pawl 211 when said pattern wheel stops. The pin 245 upon the pattern wheel 190 engages the finger 224 and forces the pin 231 upwardly and clear of the projection 223. The torsion spring 219 now tilts the lever 222 to withdraw the detent 234 and raise the pawl 210 out of engagement with the pattern wheel 190. The pattern wheel 188 now is rotated, operating the motion-changing mechanism to change from round-and-round to oscillatory motion for the formation of the toe. The cam fingers 235 and 238 vary the speed of rotation of the pattern wheels 188 and 190 by shortening the effective feed movements of the pawls 209 and 210, respectively. The length of the foot and the leg may be varied by means of the removable cam blocks 239.

The operation of the needle-switching devices may be briefly described as follows: We will assume that all of the needles are in the cylinder. When the member 78 is raised by the cam 95 the switch cam 74 is moved into position to engage the lugs 42 upon the jacks 35 as the cam ring 61 is rotated. In the rotation of said cam ring the switch cam 74 successively directs the lugs 42 up the inclined cam groove 70, the gate 72 yielding laterally to permit said lugs to pass. In the course of one complete revolution of the cam ring 61 all of the jacks 35 will have been elevated to place their needles 30 in the jacks 15. The latter are held by the cam ring 120 in proper position to receive said needles. When the member 78 is lowered by the cam 96, the switch cam 76 is moved into position to force the lugs 42 of the jacks 35 successively into the inclined cam groove 71, all of said jacks being lowered into the plane of the cylinder knitting cams in the course of a complete revolution of the cam ring 61. The cam hing 120 holds the jacks 15 in proper position for the withdrawal of the needles 30 from said jacks.

When the needles 30 are raised into the jacks 15, the projections 37 upon the jacks 35 ride up on the shoulders 38, thereby radially moving the jacks 35 outward sufficiently to provide room in the notches 36 for the yarn. The bends 33 of the needles 30 prevent play of said needles in the notches 28 of the jacks 15.

It is evident that the details of the several parts and mechanisms of the machine and their relative order or arrangement may be varied by those skilled in the art without departing from the invention. Hence the invention is not limited to the particular structure and organization of machine shown and described except to the extent clearly indicated in the claims.

I claim as my invention:

1. A knitting machine comprising a needle, two jacks for said needle, a cam acting directly upon one of said jacks for placing said needle in the other jack, and automatic means for placing said cam in and withdrawing it from operative position.

2. A knitting machine comprising a needle cylinder, a needle dial, jacks for said cylinder and said dial, knitting needles, means for operating the jacks for said dial to knit, a rotatable cam ring for said cylinder, a cam carried by said cam ring for moving the jacks in said cylinder to place the needles in the jacks of said dial, and automatic means for placing said cam in and withdrawing it from operative position.

3. A knitting machine comprising a needle dial, a needle cylinder, jacks for said cylinder and said dial, double-ended knitting needles carried by the cylinder jacks and adapted to be placed in the dial jacks, means for operating the jacks of said dial to knit, a rotatable cam ring for said cylinder, lugs on the jacks in said cylinder, said cam ring having a groove therein in which said lugs travel when the jacks are knitting, an annular ledge on said cam ring above said groove, cams for directing said lugs from said groove to said ledge and for returning them to said groove, and automatic means for moving said cams into and out of operative position.

4. A knitting machine comprising two needle beds, jacks for said beds, needles transferable from one bed to the other, lugs on certain of said jacks, a cam-carrying member having a groove therein in which said lugs travel when said jacks are knitting, a ledge on said member connected with said groove by two oppositely inclined cam grooves in said member, a cam for directing said lugs from said first mentioned groove into one of said inclined grooves, a cam for directing said lugs from said ledge into the other of said inclined grooves, and automatic means for moving said lug-directing cams into and out of operative position.

5. A knitting machine comprising a needle cylinder; a dial; jacks for said cylinder and said dial, certain of the cylinder jacks having long butts and others of said cylinder jacks having short butts; a cylinder cam ring having a groove therein in which said butts travel when said jacks are knitting; a ledge on said cam ring above and connected with said groove by two oppositely inclined cam grooves in said cam ring; a cam adapted to engage only the long butts for directing said butts from said first mentioned groove into one of said inclined grooves; a cam for directing said butts from said ledge into the other of said inclined grooves, and automatic means for moving said lug-directing cams into and out of operative position.

6. A needle-switching mechanism for knitting machines, comprising a member having two cam grooves therein, two cams arranged to move together, each for directing needles into one of said grooves, a positive lock for said cams, and means for operating said lock and moving said cams.

7. A needle-switching mechanism for knitting machines comprising a cam ring, a member movably mounted on said cam ring, two cams carried by said member, a latch pin for locking said member, a stud on said member, a cam adapted to operate said latch pin and engage said stud, and means for moving said last mentioned cam into and out of operative position.

8. A needle-switching mechanism for knitting machines comprising a cam ring, a switch-cam-supporting member movably mounted on said cam ring, a slidable latch pin for locking said member, a lever pivoted on said cam ring and connected at one end with said latch pin, a stud on the other end of said lever, a stud on said cam-supporting member, two cams adapted to engage said studs, and means for alternately moving said cams into operative position.

9. A needle-switching mechanism for knitting machines, comprising a traveling cam; two pivoted fingers carrying cams adapted to operate said first mentioned cam, said fingers having cam surfaces thereon; means tending to move said fingers in one direction; and a member adapted to engage said cam surfaces for moving said fingers in the opposite direction.

10. A needle-switching mechanism for knitting machines comprising a traveling cam; two pivoted fingers carrying cams adapted to operate said first mentioned cam, said fingers having cam surfaces thereon; means tending to move said fingers in one direction; a pivoted member adapted to engage said cam surfaces for moving said fingers in the opposite direction; and a pattern wheel and connections for moving said pivoted member.

11. A knitting machine comprising a cylinder; a dial; needles transferable from said cylinder to said dial; and means for moving said dial into and out of position to receive said needles.

12. A knitting machine comprising a cylinder; a dial; double-ended needles carried by said jacks and transferable from said cylinder to said dial; and means for lowering said dial into position to receive said needles, and for raising said dial to provide increased space between said cylinder and said dial.

13. A knitting machine comprising needles; and means for operating said needles comprising two oppositely-acting pawls, a member adapted to be engaged and moved by said pawls, one of said pawls having a shorter feed movement than the other, and means for moving said pawls.

14. A knitting machine comprising needles; means for operating said needles comprising two opposite-acting pawls and a member adapted to be engaged by said pawls, one of said pawls having a shorter feed movement than the other; means for moving said pawls; and means for holding one of said pawls out of action.

15. A knitting machine comprising needles; members for operating said needles; a cam member adapted to operate said needle-operating members; two oppositely-acting pawls adapted to engage said cam member, one of said pawls having a shorter feed movement than the other, means for moving said pawls; and means for holding out of action the pawl having the longer feed movement.

16. A knitting machine comprising needles; members for operating said needles; a cam member adapted to operate said needle-operating members; a pawl-carrying member; two oppositely-acting pawls mounted on said pawl-carrying member and adapted to engage said cam member, one of said pawls having a shorter feed movement than the other; means for holding one of said pawls out of action; and means for moving said pawl-carrying member.

17. A knitting machine comprising needles; members for operating said needles; a cam member adapted to operate said needle-operating members; two oppositely-acting pawls adapted to engage said cam member, one of said pawls having a shorter feed movement than the other; means for moving said pawls; means for holding one of said pawls out of action; and means on said cam member for operating said last mentioned means.

18. A knitting machine comprising needles; means for operating said needles comprising a cam member; two oppositely-acting pawls adapted to engage said cam member, one of said pawls having a shorter feed movement than the other; means for moving said pawls; a detent for one of said pawls; and means near opposite ends of said cam member for operating said detent.

19. A knitting machine comprising needles; means for operating said needles comprising a cam member; an oscillatory pawl-carrying member; two oppositely-acting pawls on said pawl-carrying member adapted to engage said cam member, a stationary member engaged by one of said pawls for limiting the feed movement of said pawl; a detent for the other pawl; and means on said cam member for operating said detent.

20. A circular knitting machine comprising needles; means for operating said needles comprising two cam bars; an oscillatory ring; two pairs of oppositely-acting pawls carried by said ring, each pair adapted to engage one of said cam bars, one pawl of each pair having a shorter feed movement than the other; means for holding out of action the other pawl of each pair; and means at each end of each cam bar for operating said last mentioned means.

21. In a knitting machine, in combination, a needle-operating member; a cam for moving said member; a member supporting said cam, said last mentioned member having cam surfaces thereon; members adapted to engage said cam surfaces; and means for causing relative movement between said last mentioned members and said cam-supporting member, for moving said cam into and out of operative relation with said needle-operating member.

22. In a knitting machine, in combination, a plunger carrying two pins having cam surfaces; a member adapted to engage said pins; means for moving said pins alternately into position to be engaged by said member; needle-operating means; and connections between said plunger and said needle-operating means.

23. In a knitting machine, in combination, a plunger carrying two pins having cam surfaces; a member adapted to engage said pins; a motion-changing mechanism for moving said pins alternately into position to be engaged by said member; a needle-operating means; and connections between said plunger and said needle-operating means.

24. In a knitting machine, in combination, a needle cylinder; a needle dial; knitting needles; a cylinder cam ring; a dial cam ring; a gear wheel; lugs on said dial cam ring; a post fixed on said gear wheel and engaging said lugs; and gearing connecting said gear wheel and said cylinder cam ring.

25. In a knitting machine, in combination, a needle cylinder; a needle dial; needles and web holders; a cylinder cam ring; a dial cam ring; a web-holder cam ring; a gear wheel operatively connected with said dial cam ring; gearing connecting said gear wheel and said cylinder cam ring; and a driving connection between said cylinder cam ring and said web-holder cam ring.

26. In a pattern mechanism, in combination, a pattern wheel; a pawl for rotating said pattern wheel; a pivoted lever; a detent pivoted to said lever and adapted to be inserted between the point of said pawl and said pattern wheel; and means for swinging said lever.

27. In a pattern mechanism, in combination, a pattern wheel; means for rotating said pattern wheel; means for suspending the rotation of said pattern wheel, said means comprising a lever having a cam projection thereon; means for moving said lever in one direction; a member moving with said pattern wheel adapted to ride up on said cam projection; and means for moving said member off of said cam projection.

28. In a pattern mechanism, in combination, a pattern wheel; means for rotating said pattern wheel; means for suspending the rotation of said pattern wheel, said means comprising a lever having a cam projection thereon; means for moving said lever in one direction; a member moving with said pattern wheel adapted to ride up on said cam projection; a finger on said lever adapted to lie against said member; and means for engaging said finger to move said member off of said cam projection.

29. In a pattern mechanism, in combination, a pattern wheel; a pawl for rotating said pattern wheel; a pivoted lever carrying a detent adapted to prevent engagement of said pawl with said pattern wheel; a spring tending to move said lever in one direction; a cam projection on said lever; a pin slidably mounted on said pattern wheel and adapted to ride up on said cam projection; a pivoted spring-pressed finger on said lever adapted to underlie said pin; and means for engaging said finger to move said pin off of said cam projection.

30. In a pattern mechanism, in combination, a pattern wheel; means for rotating said wheel; rotation-suspending means comprising a movable member; a member on said pattern wheel adapted to move said movable member; a finger on said movable member adapted to lie against the member on said pattern wheel; and means for engaging said finger to separate said movable member and the member on said wheel.

31. In a pattern mechanism, in combination, a pattern wheel; means for rotating said wheel; rotation-suspending means comprising a movable member; a spring tending to move said member in one direction; a pin slidably mounted on said wheel and adapted to move said member; a pivoted spring-pressed finger on said member adapted to yield laterally to permit said pin to pass; and means for engaging said finger to push said pin out of engagement with said movable member.

32. In a pattern mechanism, in combination, two pattern wheels; a single pawl for rotating one of said pattern wheels; means other than said pawl for rotating said other pattern wheel; a rest for said pawl carried by said first mentioned pattern wheel; and means carried by said other pattern wheel for withdrawing said rest.

33. In a pattern mechanism, in combination, two pattern wheels; a pawl for rotating one of said pattern wheels; means for rotating said other pattern wheel; a rest movably mounted upon the first mentioned pattern wheel; and means carried by said other pattern wheel for moving said rest with relation to said first mentioned pattern wheel.

34. In a pattern mechanism, in combination, two pattern wheels; and means for alternately rotating said wheels through a substantially complete rotation comprising a pawl for each wheel; a rest on each wheel for its pawl; and a single member on each wheel for withdrawing the rest on the other wheel, said members engaging each other.

35. In a pattern mechanism, in combination, two pattern wheels; pawls for rotating said pattern wheels; a rest movably mounted upon each pattern wheel; and pins on said rests adapted to engage each other.

36. In a pattern mechanism, in combination, three pattern wheels; means for rotating said pattern wheels; means for suspending the rotation of the first pattern wheel; means carried by said pattern wheel for actuating said suspending means; means carried by the second pattern wheel for withdrawing said actuating means; means for suspending the rotation of the second pattern wheel; means for suspending the rotation of the third pattern wheel; and means carried by the second and third pattern wheels for rendering inoperative the suspending means for each other.

37. In a pattern mechanism, in combination, two pattern wheels, one of said wheels having peripheral ratchet teeth; a pawl engaging said teeth for rotating said pattern wheel; a rest for said pawl carried by the last mentioned pattern wheel; means other than said pawl for rotating the other pattern wheel; and means mounted on the side of said other pattern wheel for withdrawing said rest from beneath said pawl.

38. In a pattern mechanism, in combination, two pattern wheels rotatably mounted on the same axis; two pawls, each for rotating one of said pattern wheels; means carried by each wheel for preventing engagement of said wheel by its pawl; and means carried by each pattern wheel for withdrawing the engagement-preventing means of the other wheel.

39. In a pattern mechanism, in combination, two pattern wheels rotatably mounted side by side; two pawls each for rotating one of said pattern wheels; means carried by each wheel for preventing engagement of said wheel by its pawl; and a member mounted on the side of each wheel for operating the engagement-preventing means of the other wheel.

40. A pattern mechanism comprising a pattern wheel; a pawl for rotating said wheel; a slidably mounted rest for said pawl on said wheel; a spring on said wheel tending to hold said rest in one position; and means for moving said rest into another position.

41. A knitting machine for knitting a stocking consisting of two kinds of web, comprising needles; means for actuating said needles to knit; a motion-changing mechanism; a needle-switching mechanism; a fashioning mechanism; and a pattern mechanism comprising means controlling said motion-changing mechanism and said fashioning mechanism, and means controlling said needle-switching mechanism.

42. A knitting machine for knitting a stocking consisting of plain-stitch web and rib-stitch web, comprising a set of needles; means for actuating the needles to knit; a mechanism for switching certain of the needles from plain-stitch knitting position to rib-stitch knitting position; a motion-changing mechanism; a fashioning mechanism; and a pattern mechanism comprising means controlling said motion-changing mechanism and said fashioning mechanism, and means controlling said needle-switching mechanism.

43. A knitting machine for knitting a stocking consisting of plain-stitch web and rib-stitch web, comprising a set of needles; means for actuating the needles to knit; a mechanism for switching certain of the needles from plain-stitch knitting position to rib-stitch knitting position; a motion-changing mechanism; a fashioning mechanism; and a pattern mechanism comprising a pattern wheel controlling said motion-changing mechanism and said fashioning mechanism, and a pattern wheel controlling said needle-switching mechanism.

44. A knitting machine having a needle cylinder, a needle dial, double-ended needles transferable from the cylinder to the dial and vice versa, cylinder jacks having notches therein to receive one end of each of said double-ended needles, said cylinder being grooved to receive said jacks, and shoulders being formed in said grooves, said jacks having projections adapted to ride up on said shoulders, and means for elevating said jacks to transfer their needles.

45. A needle-switching mechanism for knitting machines comprising a cam ring having knitting cams; two oppositely inclined guide portions extending from an idle level to the knitting level; two yielding members for preventing needles from being acted upon by said guide portions; two switch cams adapted to direct the needles against said guide portions; and means for moving said switch cams into and out of operative position.

46. A knitting machine comprising a needle dial and a needle cylinder; jacks for said needle beds; knitting needles adapted to said jacks, certain of said needles being transferable from one of said needle beds to the other; means for operating the dial jacks to knit; means for operating the cylinder jacks to knit; means for automatically shifting certain of the cylinder jacks to transfer their needles to the dial; subjacks for the cylinder jacks; and fashioning mechanism operatively connected with the subjacks.

ANDREW W. REDIN.

Witnesses:
CORDELIUS EKSTROM,
OSCAR N. EMERSON.